United States Patent [19]
Chen et al.

[11] Patent Number: 6,101,523
[45] Date of Patent: Aug. 8, 2000

[54] METHOD AND APPARATUS FOR CONTROLLING CALCULATION ERROR

[75] Inventors: Hongyi Chen; Zhiqiang Zeng, both of Beijing, China

[73] Assignee: United Microelectronics Corp., Hsinchu, Taiwan

[21] Appl. No.: 09/081,006

[22] Filed: May 19, 1998

[51] Int. Cl.[7] ................ G06F 7/50; G06F 11/00; G06F 17/14

[52] U.S. Cl. ............ 708/700; 708/400; 708/530

[58] Field of Search ................ 708/400, 401, 708/402, 403, 404, 405, 406, 407, 408, 409, 530, 700, 703, 706, 707

[56] References Cited

U.S. PATENT DOCUMENTS

| | | | |
|---|---|---|---|
| 4,760,543 | 7/1988 | Ligtenberg et al. | 708/400 |
| 5,034,910 | 7/1991 | Whelchel et al. | 708/407 |

*Primary Examiner*—Ohuong Dinh Ngo
*Attorney, Agent, or Firm*—J.C. Patents; Jiawei Huang

[57] ABSTRACT

A method and an apparatus for controlling calculation error produced by the accumulation error due to digit truncation in a non-integer computation. The error is eliminated by controlling the values of LSB, $C_{in}$ and the addition/subtraction selecting signal as, so that $C_{in}$ is not necessarily equal to $C_{in}$. Considering a even number of cascaded pipelines, $C_{in}$ in the odd pipelines is set as 0, wherein $C_{in}$ in the even pipelines is set as 1. The resultant error is thus eliminated mutually by odd and even pipelines.

3 Claims, 2 Drawing Sheets

METHOD AND APPARATUS FOR CONTROLLING CALCULATION ERROR

BACKGROUND OF THE INVENTION

1. Field of the Invention

The invention relates to a method and an apparatus for controlling accumulation error produced by digit truncation due to digit truncation in a non-integer computation, and more particular to a method and an apparatus for controlling an accumulated error after fast rotation.

2. Description of the Related Art

The amount of information in digital images, especially in high definition television (HDTV) images and high resolution medical X-ray images, is enormous. With the aid of image coding techniques, the total amount of image data can be reduced to an acceptable amount. Transforming coding is one of the most efficient methods of data compression for correlated signals.

It has been proved theoretically that Givens rotation based on rotation arithmetic to achieve various orthogonal transforms has the optimal data stability or robustness. However, since the word length of transform coefficient is limited for hardware implementation, so that a template error is produced for rotation. This error is static and is independent of input signal. On the other hand, the intermediary computation results under transform processing are stored. But the word length of the storage unit is limited. As a consequence, digits have to be truncated or omitted. The truncated digits are result in calculation error. The calculation error is dynamic and is dependent of input data. In a rotation network, the error is transferable. The calculation error is accumulated in each step of hardware implementation. The path to produce a maximum calculating error is called an error accumulating critical path. Evaluation of error range according to the error accumulating critical path, the reserved internal bus bits for accumulated errors are obtained.

The calculation error in a fast rotator is introduced by shift-addition calculation of fast rotation. The implemented hardware for this shift-addition calculation comprises a shifter, for example, a barrel shifter, and an adder/subtractor.

A conventional adder/subtractor is shown as FIG. 1. The conventional adder/subtractor comprises two terminals for data input of A and B. The input data B output from the shifter 104 is to go through an exclusive OR (XOR) 102 before being input into a full adder 101. An addition/subtraction selecting signal, as, is input into the same XOR 102 as the input data B. The terminal of the least significant bit (LSB) input $C_{in}$ is coupled to the addition/subtraction selecting signal terminal, so that as=$C_{in}$. The resultant output is denoted as S.

The schematic drawing for the operation of the shifter 104 is shown as FIG. 2. Under the digit shift process, an input data $B_{in}$ is right shifted. The sign digits, that is, the most significant digit (MSB) are right shifted, so that an expansion of sign digits Exp is obtained. Since the input data $B_{in}$ has been right shifted, a number of digits T near the LSB are truncated. The right-shift is directed as the arrow Rs, and the output data B is as shown in the figure.

Under certain condition of fast rotation pipeline, the input data B is always small. By setting as=$C_{in}$, S is always smaller than the correct value for addition operation (for an error less than 1LSB is set as 1). On the contrary, S is always larger for subtraction operation with as=$C_{in}$. As shown in FIG. 3, since the addition/subtraction operation is performed in random, the error $\epsilon_i$ of each stage is evenly distributed within the interval [−1,1]. The expectation value of this distribution is 0, whereas the standard deviation is $$\sigma = \sqrt{\frac{1}{3}}.$$

For the error produced in a critical path of 512 pipelines which are needed to perform 32×32 block image transform, the expectation value is 0, and the standard deviation is $$\sigma = \sqrt{\frac{512}{3}} \approx 13.1.$$

Setting 3σ is the range of error, only 3% of the actual error is out of this range. The probability decreases abruptly with increasing the values which are out of this range. Therefore, a reserving bits for accumulated error is 6 (to allow 3σ≦64).

SUMMARY OF THE INVENTION

It is therefore an object of the invention to provide a method and an apparatus for controlling calculation error produced by the accumulation error due to digit truncation in a non-integer computation. The error is eliminated by controlling the values of LSB, $C_{in}$ and the addition/subtraction selecting signal as, so that $C_{in}$ is not necessarily equal to $C_{in}$. Considering a even number of cascaded pipelines, $C_{in}$ in the odd pipelines is set as 0, wherein $C_{in}$ in the even pipelines is set as 1. The resultant error is thus eliminated mutually by odd and even pipelines.

To achieve these objects and advantages, and in accordance with the purpose of the invention, as embodied and broadly described herein, the invention is directed towards an apparatus for controlling calculation error. The apparatus is in a form of an adder/subtractor, comprises: an full adder; a first input terminal, connecting with the full adder to input a first data from external to the full adder; a second input terminal, connecting with the full adder to input a second data output from a shifter to the full adder; a least significant bit input terminal, to input a least significant bit input data; an exclusive OR, connecting between the least significant bit input terminal and the full adder, through which the least significant bit input data is input into the full adder, an addition/subtraction selecting signal input terminal, to input an addition/subtraction signal to the full adder; and an output terminal.

To achieve these objects and advantages, and in accordance with the purpose of the invention, as embodied and broadly described herein, the invention is directed towards a method of controlling a calculation error. An adder/subtractor in which a least significant bit input terminal is disconnected with an addition/subtraction selecting signal input terminal is provided. An even number of cascaded pipelines for fast rotation is further provided. By setting the least significant bit input terminal as 0 for each of the odd numbered pipelines; and setting the least significant bit input terminal as 1 for each of the even numbered pipelines, the error for each set of an odd and an even numbered pipelines are eliminated mutually.

It is to be understood that both the foregoing general description and the following detailed description are exemplary and explanatory only and are not restrictive of the invention, as claimed.

DESCRIPTION OF THE PREFERRED EMBODIMENTS

In the invention, by disconnecting the terminals of the LSB input, $C_{in}$, and the addition/subtraction selecting signal input, as, $C_{in}$ is not necessarily equal to as. That is, the LSB input, $C_{in}$ can be chosen as required. Considering a fast rotation with an even number of pipelines, setting $C_{in}$ to 0 for all odd numbered pipelines and $C_{in}$ to 1 for all even numbered pipelines, the total error for all pipelines is eliminated. Therefore, in the hardware design of a fast rotator, the reserving bits for accumulation error are minimized. The area of the hardware is reduced without increasing cost.

Figure 1:
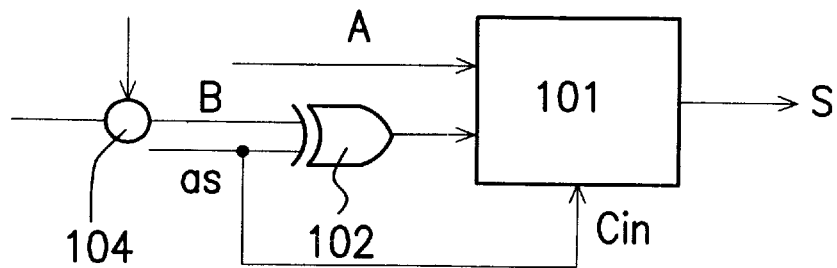
FIG. 1 shows the configuration of conventional adder/subtractor.
Figure 2:
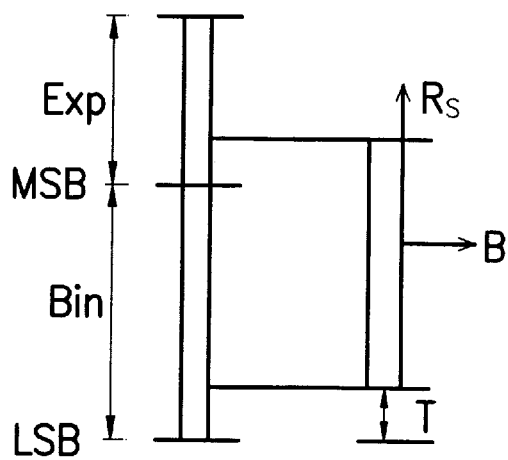
FIG. 2 shows a schematic drawing for the operation of a shifter.
Figure 3:
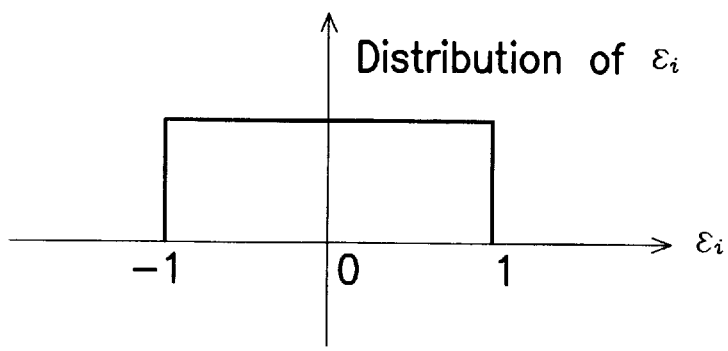
FIG. 3 shows the distribution of error in the conventional adder/subtractor shown as FIG. 1.
Figure 4:
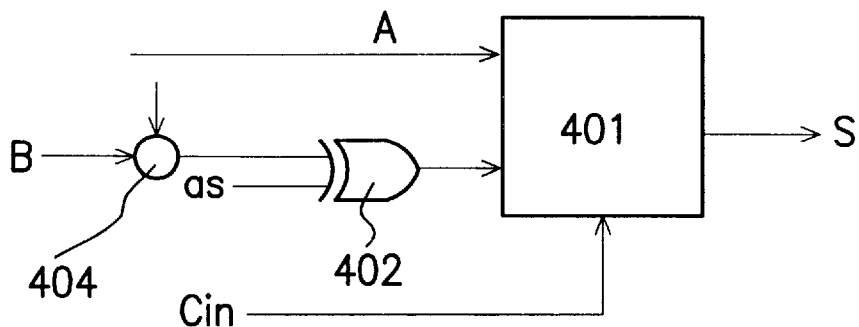
FIG. 4 shows the configuration of an adder/subtractor in a preferred embodiment according to the invention.

In FIG. 4, the configuration of an adder/subtractor according to the invention is shown. The conventional adder/subtractor comprises two terminals for data input of A and B. The input data B output from the shifter 404 is to go through an exclusive OR (XOR) 402 before being input into a full adder 401. An addition/subtraction selecting signal, as, is input directly into the XOR 402 without being also input to the full adder 401 serving as a Cin input. Therefore, the values of $C_{in}$ and as are determined independently. The resultant output is denoted as S.

Figure 5:
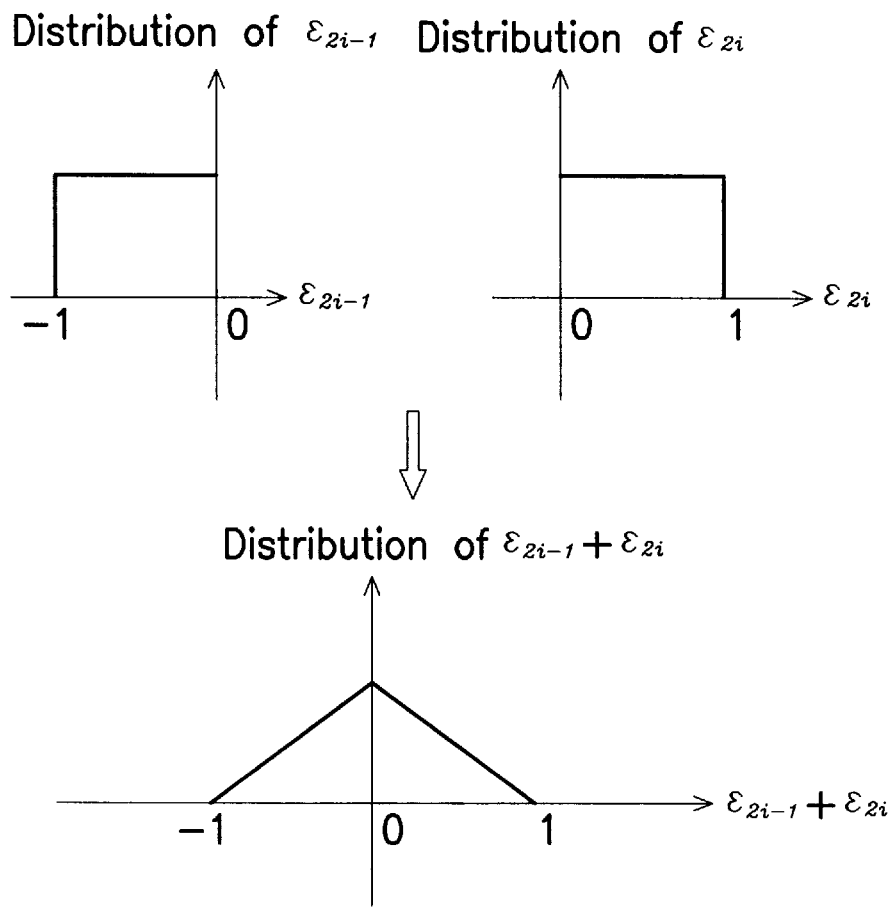
FIG. 5 shows the distribution of error in the adder/subtractor shown as FIG. 4.

By employing a small input S for adder/subtractor and the characteristic of pipeline technique of fast rotation, the standard deviation can be improved. For the adder/subtractor in every even stage, $C_{in}$ is set as 0 for either kind of calculation since the result is small with a small input B. On the contrary, for the adder/subtractor in every odd stage, $C_{in}$ is set as 1 for either kind of calculation since the result is large with a large input B. Since the operation of each stage is based on the result of its previous stage, by introducing an error alternatively small or lager, the total introduced error is mutually eliminated. While setting $C_{in}$ as 0 or 1 alternatively, the distribution for error of two neighbouring stages of pipelines, $\epsilon_{2i-1}+\epsilon_{2i}$ in range $[-1,1]$ is a triangular distribution as shown in FIG. 5. The expectation value of this distribution of the error $\epsilon_{2i-1}+\epsilon_{2i}$ is 0, whereas the standard deviation is $$\sigma = \sqrt{\frac{1}{6}}.$$

For the error produced in a critical path of 256 pairs of pipelines, the expectation value is 0, and the standard deviation is $$\sigma = 16\sqrt{\frac{1}{6}} \approx 6.5.$$

The standard deviation is only half of it for setting $C_{in}$=as. Setting $3\sigma$ as the level of error, a reserving bits for accumulated error is 4 (to allow $3\sigma \leq 16$). Therefore, the chip area is reduced without increasing cost of hardware.

Other embodiment of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An apparatus for controlling calculation error, comprises:

a full adder, having a first input terminal, a second input terminal, a carry input terminal, and an output terminal, wherein the first input terminal is used to receive a first set of data input, the carry input terminal is used to receive a least significant bit (LSB) data, and the output terminal is used to export a processed result;

an exclusive OR, which exports outputs to the second input terminal of the full adder, and receives a second set of data and an addition/subtraction signal; and an addition/subtraction selecting signal input terminal, used to also input an addition/subtraction selecting signal to the exclusive OR, wherein the LSB data is separately set to be "0" or "1" according to a circuit design, independent from the addition/subtraction selecting signal.

2. The apparatus of claim 1, wherein an even number of the full adders are used together in a fast rotation for accumulating calculation errors, and the LSB data of the even number of the full adders are alternatively set to be "0" and "1".

3. A method of controlling a calculation error, comprising:

providing an even number of cascaded pipelines, wherein each of the pipelines comprises a full adder, which has a first input terminal, a second input terminal, a carry input terminal, and an output terminal;

inputting a first set of data from a previous level to the first input terminal, while inputting a least significant bit (LSB) data to the carry input terminal of each the full adder, and inputting a second set of data to the second input terminal of each the full adder, respectively;

using an addition/subtraction signal to set the second set of data to be whether added or subtracted, wherein the output terminal is used to export a processed result to a next level;

setting the LSB data as 0 for each of the odd numbered pipelines; and setting the LSB data as 1 for each of the even numbered pipelines.

* * * * *